United States Patent
Suryanarayana et al.

(10) Patent No.: US 12,007,841 B2
(45) Date of Patent: Jun. 11, 2024

(54) DISASTER RECOVER PREPAREDNESS WITH TRUSTED FIRMWARE BOOT METHOD OVER A SMART PHONE

(71) Applicant: Dell Products L.P., Round Rock, TX (US)

(72) Inventors: Shekar Babu Suryanarayana, Bangalore (IN); Ibrahim Sayyed, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 318 days.

(21) Appl. No.: 17/722,762

(22) Filed: Apr. 18, 2022

(65) Prior Publication Data
US 2023/0333933 A1  Oct. 19, 2023

(51) Int. Cl.
| G06F 11/14 | (2006.01) |
| G06F 9/4401 | (2018.01) |
| G06F 21/57 | (2013.01) |

(52) U.S. Cl.
CPC ........ *G06F 11/1417* (2013.01); *G06F 9/4408* (2013.01); *G06F 11/1448* (2013.01); *G06F 11/1469* (2013.01); *G06F 21/575* (2013.01)

(58) Field of Classification Search
CPC ............ G06F 11/1417; G06F 11/1448; G06F 11/1469; G06F 21/575; G06F 9/4408
See application file for complete search history.

(56) References Cited

U.S. PATENT DOCUMENTS

| 9,846,640 | B2 * | 12/2017 | Boyapalle | G06F 9/4401 |
| 10,754,955 | B2 * | 8/2020 | Jreij | H04L 9/083 |
| 2016/0232057 | A1 * | 8/2016 | Star | G06F 9/4408 |

* cited by examiner

*Primary Examiner* — Terrell S Johnson
(74) *Attorney, Agent, or Firm* — Womble Bond Dickinson (US) LLP

(57) ABSTRACT

Methods and systems for managing the operation of data processing systems are disclosed. A data processing system may include a computing device that may enter various operating states by performing various types of startups. Performance the startups may require access to various portions of data which may become unavailable and thereby prevent startup completion. The data processing systems may host a management controller that may facilitating performing a specialized startup process through which unavailable data may be retrieved from other devices via intermediary devices, and may reduce risk in connecting to other devices through verification, validation, and/or other processes.

20 Claims, 8 Drawing Sheets

DISASTER RECOVER PREPAREDNESS WITH TRUSTED FIRMWARE BOOT METHOD OVER A SMART PHONE

FIELD OF THE EMBODIMENTS

Embodiments disclosed herein relate generally to device management. More particularly, embodiments disclosed herein relate to systems and methods to manage performance of startup processes.

BACKGROUND

Computing devices may store data and used stored data. For example, computing devices may utilize data when providing computer implemented services. If computing devices are unable to access data, the computing devices may be unable to provide some, or all, of the computer implemented services that they are able to provide with access to data.

BRIEF DESCRIPTION OF THE DRAWINGS

Embodiments are illustrated by way of example and not limitation in the figures of the accompanying drawings in which like references indicate similar elements.

DETAILED DESCRIPTION

Figure 1:
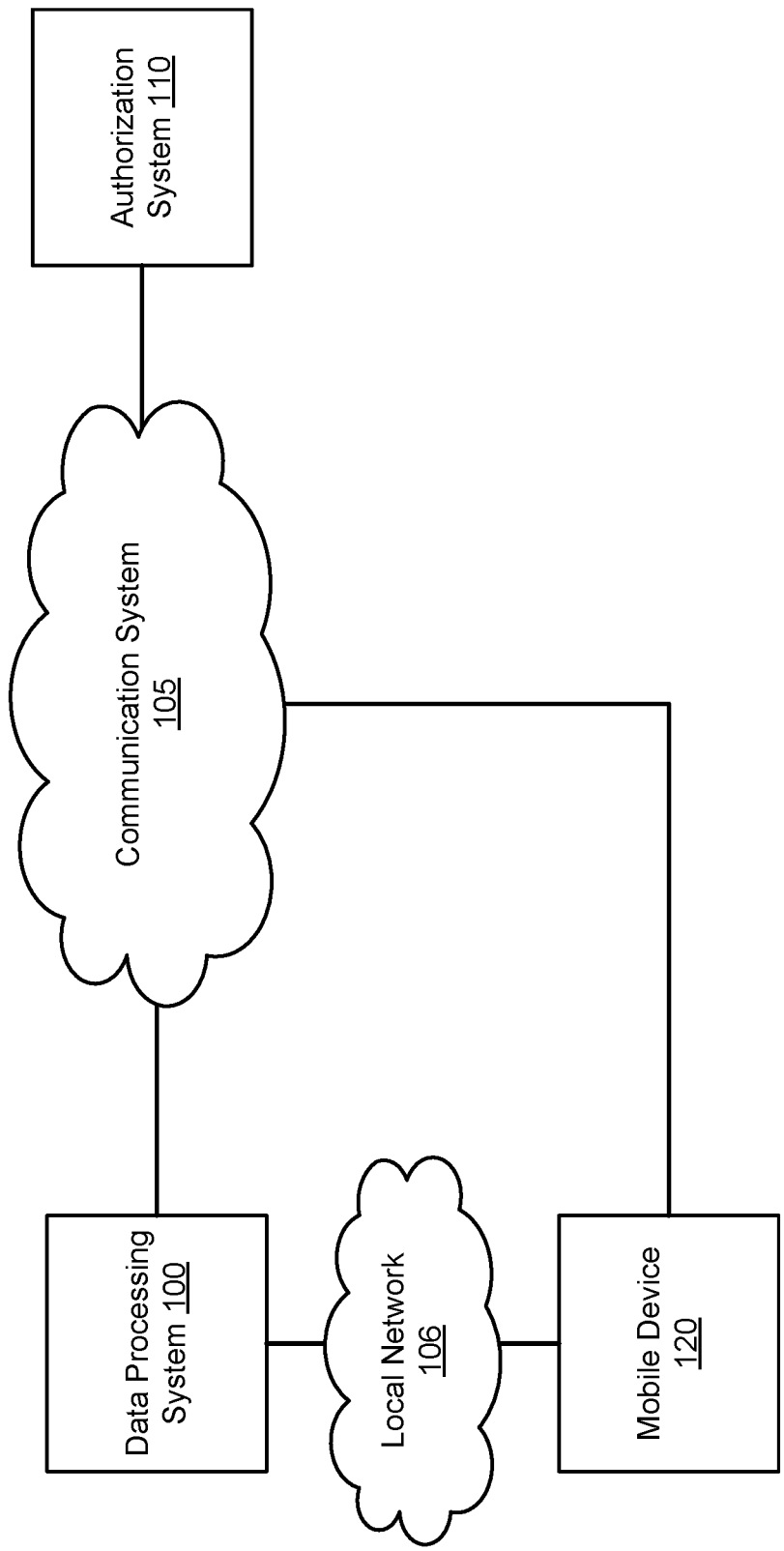
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing the operation of data processing system. A data processing system may include a computing device that may operate in various manner (e.g., operating states). The data processing system may perform different startups (e.g., one or more actions) to enter respective operating states.

Different operating states may be conducive to different functions. For example, some operating state may facilitate provisioning of desired computer implemented services, while other operating states may facilitate management operations such as rescues, modifications in fundamental operation, etc.

To enter any of these operating states, a data processing system may need to have access to data (e.g., code, configuration settings, etc.). If the data is unavailable, then the data processing system may be unable to complete startups to enter the operating states.

To facilitate startup completion, a management controller of a data processing system may modify a startup process performed by the data processing system. The modified startup process may allow the data processing system to connect to a device via a local network, use the connected device to connect to other devices (e.g., that may have access to desired data), verify the identifies of the devices, and/or retrieve data from the other connected devices.

The data processing system may use the retrieved data to complete startup processes that otherwise would not be able to be completed using local data. By doing so, embodiments disclosed herein may improve the likelihood of data processing systems entering desired operation states in which desired computer implemented services are provided. Further, the disclosed processes may facilitate doing so prior to handoff to a higher level management entity such as an operating system, and may proactively address risk associated with connecting to other devices while the data processing system is in the pre-operating system state.

In an embodiment, a computer-implemented method for managing operation of a data processing system is provided. The method may include detecting a boot failure of the data processing system; in response to the boot failure and as part of a startup of the data processing system: activating a recovery for the data processing system using a device connectable via a local wireless network, the device being operably connected to an authorization system; connecting to the device via the local wireless network for the recovery; making a first determination that the device is verified; based on the first determination: establishing a connection to the authorization system via the device; obtaining a signed file from the authorization system; making a second determination that a signature of the signed file is verified; and updating the startup of the data processing system using the file based on the second determination.

The connection to the authorization system may be secured using a pre-shared key.

The first determination may be made by providing an authorization pattern to the device, the authorization pattern being known to a management controller of the data processing system and the authorization system but not the device.

The first determination may further be made by receiving a one-time password from the device, the one-time password being generated by the authorization system and verifiable by the management controller using a public key for the authorization system.

The computer-implemented may also include registering, with the authorization system, the device, the device registration associating the authorization pattern with contact information for the device, the contact information indicating a different communication path for communicating with the device than a communication path through which the authorization pattern is provided to the authorization system.

The first determination may further be made by receiving a signed blob, the signed blob being signed by the authorization system and comprising an identifier for the device, an identifier for the data processing system, and an identifier of a startup management entity hosted by the data processing system. The signed blob may be a signed registration.

The first determination may further be made by verifying the signed blob against data stored in the management controller and known to the authorization system.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide any quantity and type of computer implemented services. To provide computer implemented services, the system of FIG. 1 may include one or more of data processing system 100 operably connected to authorization system 110 and/or mobile device 120 via communication system 105. Data processing system 100 may also be connected to mobile device 120 via local network 106. Each of these components is discussed below.

Data processing systems 100 may provide computer implemented services to users and/or other computing devices operably connected to data processing system 100. The computer implemented services may include any type and quantity of services including, for example, database services, instant messaging services, video conferencing services, etc. To provide these services, data processing system 100 may host applications that provide these (and/or other) computer implemented services. The applications (or other types of executing entities) may presume (and/or may require for proper operation of the applications) that a data processing system hosting the application is operating in a predetermined manner. The predetermined manner of operation may include, for example, executing an operating system, drivers, and/or other type of management entities that mediate, facilitate, or otherwise operate in a manner which enables the applications to operate (e.g., by providing abstracted access to hardware resources used in the execution of the applications).

To operate in the predetermined manner, data processing system 100 may perform one or more operations to enter the predetermined manner of operation (by changing from other manners of operation to the predetermined manner of operation). These operations may include, for example, a boot process from a power-on (or reset or other manner of operation that differs from the predetermined manner of operation to the extent that the applications may not be able to operate) to hand off operation of data processing system 100 to an operating system or other type of operational management entity that places data processing system 100 into the predetermined manner of operation. The operating system may, for example, provide abstracted access to resources (e.g., processing resources provided by processors, memory resource provided by memory modules, storage resources provided by storage devices, etc.) utilized by the applications hosted by data processing system 100.

For example, consider a scenario where a data processing system has been shut off. After the data processing system is turned on, the data processing system may be operating in a startup manner (e.g., performing a boot) such that the data processing system is not yet able to support execution of an application (e.g., the application may not be able to successfully execute until the data processing system hosts an operating system). To enter the predetermine manner of operation conducive to execution of the application, the data processing system may go through a boot process which may be performed by a type of management entity such as a basic input-output system and/or other startup management entities. The management entity may perform any number of actions (e.g., a "startup process") to prepare the data processing system to begin execution of an operating system or other type of management entity that facilitates execution of applications (and/or operation of certain types of hardware devices such as application specific integrated circuits that may provide certain functions without need for a software layer).

These actions may include, for example, inventorying the hardware components hosted by a host device, loading drivers or other software components, configuring hardware and/or software components, etc. As part of the startup process, the management entity may also load code, configuration settings, and/or other data corresponding to an operating system (and/or other management entity types and/or other types of executing entities) to memory. The data may be stored in persistent storage thereby allowing it to be read into memory.

Once the data is loaded into memory, the data processing system may initiate execution of code (e.g., computer instructions) included in the data in memory to begin operation of the operating system. The executing code may utilize configuration settings and/or other information also included in the data in memory.

Once the data processing system hosts the operating system and/or performs other types of predetermined operations, discussed above, then the applications may begin to provide the computer implemented services. However, the aforementioned process, if not completed in a predetermined manner, may leave the data processing system in a condition where it is unable to provide the computer implemented services, may provide compromised computer implemented services, and/or may otherwise operate in a manner different from expected, desired, etc.

For example, the startup management entity that may be capable of performing startups (e.g., boots) of data processing system 100 may rely on various pieces of information being available such as code that defines its operation, configuration settings, etc. If any of these pieces of information are not available (e.g., due to corruption or other mechanisms through which data may be unavailable), then the startup management entity may not be able to complete a startup of data processing system.

In the event that the startup management entity is unable to complete a boot, the startup entity may attempt to retrieve copies of the unavailable information from other sources. However, to do so, certain drivers may need to be hosted by data processing system 100, data processing system 100 may need to be able to perform certain function, etc. The unavailable information may prevent or limit the ability of data processing system 100 to retrieve the data from these other sources.

For example, to retrieve copies of unavailable information from other sources, data processing system 100 may need to communicate via communication system 105. But to do so, data processing system 100 may need to load software stacks, initialize various pieces of hardware, and/or perform other actions, which may not be possible if certain types of information are unavailable.

In general, embodiments disclosed herein relate to systems, devices, and methods for improving the likelihood that data processing system 100 is able to provide computer implemented services by entering a predetermined operating state. To improve the likelihood that data processing system 100 is able to provide computer implemented services, data processing systems 100 may include a management controller (e.g., onboard management controller).

The management controller may identify when the host data processing system 100 is unable to complete startups (e.g., due to unavailable data) and is also unable to retrieve copies of unavailable data, used in the startups of data processing system 100, from other sources. In response to this identification, the management controller may modify the startup process performed by data processing system 100 to (i) allow data processing system 100 to communicate with mobile device 120 via local network 106, (ii) perform verifications of mobile device 120, authorization system 110, and/or data obtained from these entities, and (iii) use data obtained through the connectivity to mobile device 120 to complete a subsequently performed startup. For example, the obtained data may be used to repair data to make unavailable data available, to supplement existing data used during startups, and/or for other purposes that may allow for subsequently performed startups (e.g., boots) to successfully complete. By doing so, a data processing system may continue to complete startups even after it is unable to, for example, load network drivers or other entities necessary to obtain data from other sources.

Mobile device 120 may operate as an intermediary for communications between data processing system 100 and authorization system 110 while data processing system 100 is unable to communicate with authorization system 110 on its own (e.g., due to unavailable network drivers, etc.). To operate as an intermediary, data processing system 100 may communicate with mobile device 120 via local network 106. Local network may be a wireless or wired local network such as, for example, a blue tooth network.

However, connecting to mobile device 120 via local network 106 may present some degree of risk (e.g., another device may be masquerading as mobile device 120). To manage this risk, the management controller of data processing system 100 may (i) perform a verification process for mobile device 120, (ii) perform a verification process for authorization system 110, and/or (iii) verify the authenticity of data received from mobile device 120. Doing so may reduce the risk associated with connecting to mobile device 120 and/or obtaining data from authorization system 110.

To do so, the management controller may store copies of data usable to perform these verifications. For example, the management controller may store (i) copies of data patterns known to authorization system 110, (ii) copies of one-time passwords known to authorization system 110, (iii) public keys for authorization system 110, (iv) information regarding mobile device 120 known to authorization system 110, and/or (v) other types of data usable to perform verifications. Any of the aforementioned data may act as a shared secret known to all, or a portion, of the components of FIG. 1. For example, any of these pieces of data may be stored in the management controller of data processing system 100 in a production setting prior to deployment to a client site. Corresponding data may be stored in authorization system 110 as part of the production process for data processing system 100.

Authorization system 110 may facilitate verifications performed by data processing system 100 through registration. For example, data processing system 100 may, prior to an unsuccessful boot, register mobile device 120 and/or itself with authorization system 110. The registration process may provide copies of data to data processing system 100 and/or authorization system 110 usable to determine whether a device alleging to be mobile device 120 is actually mobile device 120. The registration process may entail, for example, using a data structure that includes, for example, (i) an identity of an application hosted by mobile device 120 that will facilitate operation of mobile device 120 as an intermediary, (ii) an identity of data processing system 100, and/or an (iii) identity of a startup management entity (e.g., of data processing system 100 and/or mobile device 120). During the aforementioned registration process, authorization system 110 may sign the data structure and provide a copy of the signed data structure to mobile device 120. Similar information may be provided to data processing system 100. By doing so, data processing system 100 may, while attempting to connect to mobile device 120, verify whether a device to which data processing system 100 is connecting is mobile device 120.

Any of data processing system 100, authorization system 110, and mobile device 120 may be implemented using a computing device such as a host or server, a personal computer (e.g., desktops, laptops, and tablets), a "thin" client, a personal digital assistant (PDA), a Web enabled appliance, a mobile phone (e.g., Smartphone), and/or any other type of computing device or system. For additional details regarding computing devices, refer to FIG. 7.

Figure 7:
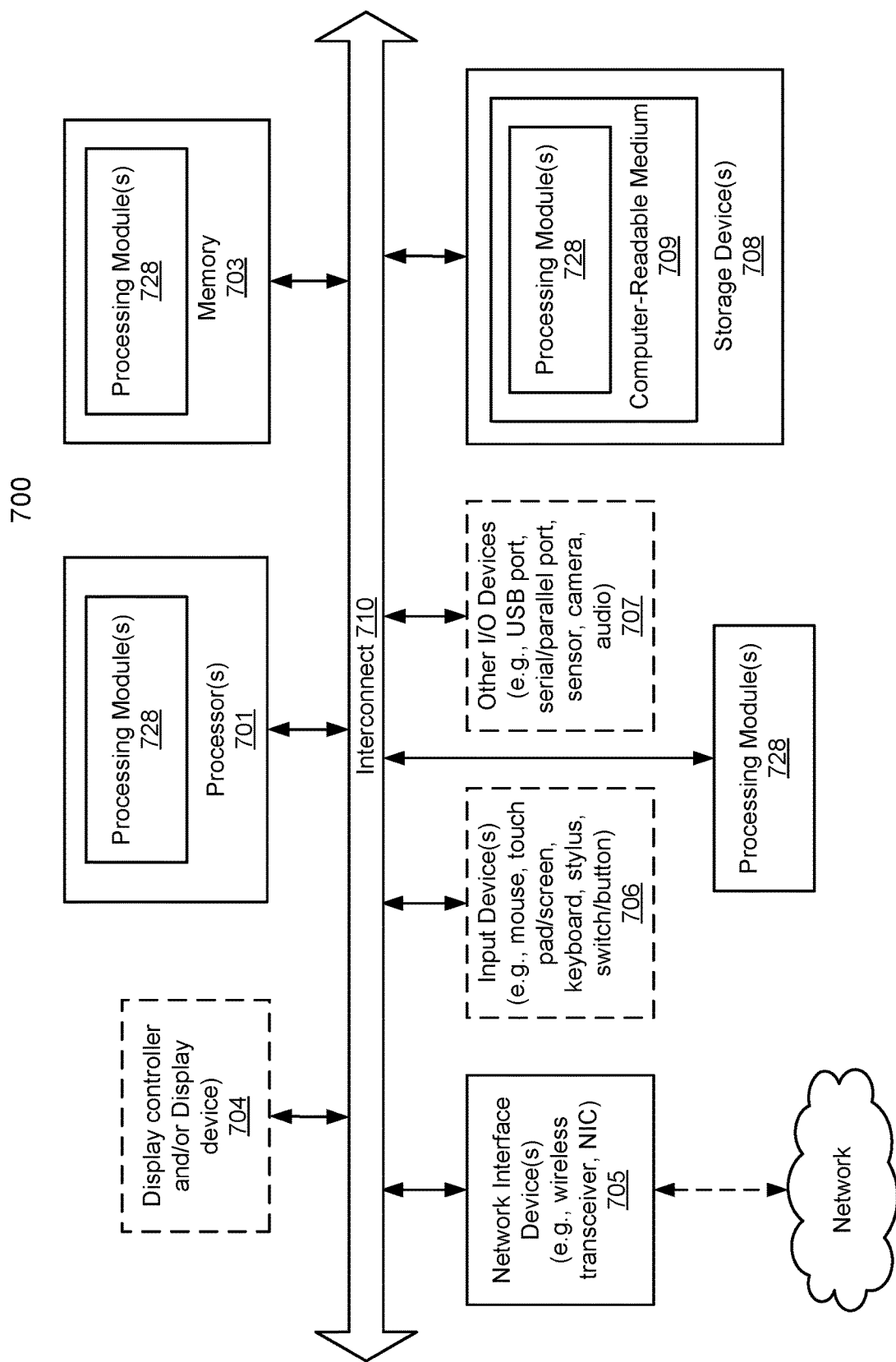
FIG. 7 shows a block diagram illustrating a computing device in accordance with an embodiment.

In addition to the components illustrated in FIG. 7, data processing system 100 may also include a management controller. A management controller may be a hardware device hosted by data processing system 100 that operates independently. The management controller may be operably connected to data bus and/or the hardware components of data processing system 100. Consequently, if data processing system 100 fails to complete a startup, the operation of the management controller may not be impacted by the startup failure. Rather, the management controller may monitor startup processes and/or modify the startup processes. The management controller may be implemented with, for example, system on a chip or other type of hardware device. Consequently, the management controller may include separate processors, memory modules, storages, etc. from that of host data processing system 100. The information usable to verify mobile device 120, authorization system 110, and/or other data structures may be stored in storage of the management controller and/or data processing system.

The management controller may include functionality to communicate with hardware and/or programs executing on data processing system 100 through any communication scheme. In an embodiment, the communication scheme is through a mailbox scheme where data, to be communicated to the other entities, is stored in predetermined locations in storage/memory that may be accessed by these entities. The entities may be notified when data is stored in these locations thereby triggering the entities to read and/or take the data into account in their operation. Through this approach, for example, the management controller may provide the host data processing system with various data structures usable to verify identities of other devices, data structures received from the other entities, data structures usable to secure communications with other entities (e.g., usable to establish session keys and/or other types of data structures for encrypted communications), and/or other types of data structures. The entities of the data processing system may communicate with the management controller in a similar manner.

The system of FIG. 1 may include any number and types of data processing system 100. Any of the aforementioned device may operate independently and/or cooperatively with other data processing systems (not shown) to provide computer implemented services. Data processing system 100 may provide such services to, for example, user of the data processing system 100, to other data processing system (not shown), and/or to other types of devices not shown in FIG. 1.

In an embodiment, communication system 105 includes one or more networks that facilitate communication between data processing system 100, authorization system 110, and mobile device 120. The networks may include, for example, wired networks, wireless network, public networks, private network, the Internet, etc. In an embodiment, communication system 105 includes a radio access network through which mobile device 120 is connected.

In an embodiment, local network 106 is implemented as a blue tooth network that facilitates direct communications between data processing system 100 and mobile device 120. Local network 106 may not always be operating. For example, local network 106 may be established while data processing system 100 is unable to communicate with authorization system 110 through communication system 105. Local network 106 may be implemented with other types of communication network/standards without departing from embodiments disclosed herein.

While illustrated in FIG. 1 as included a limited number of specific components, a system in accordance with an embodiment may include fewer, additional, and/or different components than those illustrated therein.

As discussed above, the management controller of data processing system 100 may selectively cause startups to be modified so that data usable to complete the startups may be obtained from an authorization system via a mobile device.

Figure 2:
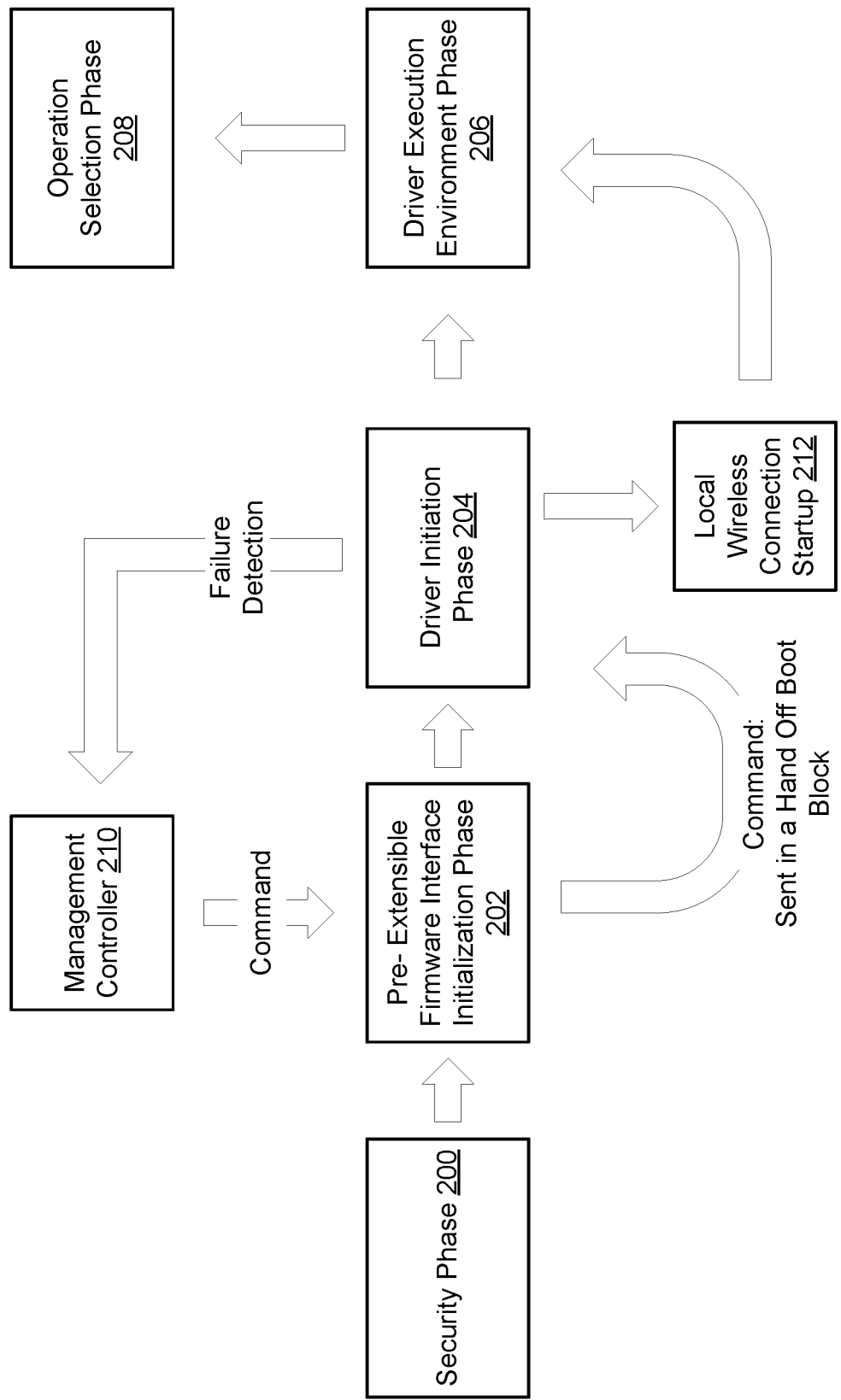
FIG. 2 shows a block diagram illustrating a startup process for a data processing system in accordance with an embodiment.

Turning to FIG. 2, a diagram of a startup process and modifications to the startup process that may be performed in accordance with an embodiment is shown.

Generally, a startup management entity (e.g., a startup manager) of data processing system 100 may perform various phases 200, 202, 204, 206, and 208 until handoff to a management entity (e.g., an operating system). These phases may prepare the hardware and/or software resources of the data processing system for management by the management entity.

For example, the phases may include security phase 200, pre-extensible firmware interface initialization phase 202, driver initiation phase 204, driver execution environment phase 204, and operation selection phase 208. These phases may be performed sequentially when a startup is completed as expected. Operation selection phase 208 may facilitate handing off operation of the data processing system to varying management entities.

However, the completion of each of these phases may rely on the availability of certain types of data such as, for example, drivers for hardware devices, configuration settings, etc. If some of this data is unavailable, the startup may not be able to complete successfully. Further, if some of this data is unavailable, data processing system 100 may be unable to retrieve data from other sources usable to supplement/repair/replace the unavailable data which may otherwise allow for successful completion of the startup.

To facilitate startup completion even under such conditions, management controller 210 may monitor the performance of these phases 200-208. Based on the monitoring, management controller 210 may determine whether action on the part of the management controller may need to be taken. For example, management controller 210 may determine whether drivers that facilitate network communications are loaded as part of the startup. Lack of such drivers may prevent data processing system 100 from communicating with other devices via communication system 105.

When management controller 210 identifies that such conditions have occurred, management controller 210 may modify all, or a portion, of the phases to allow data processing system 100 to communicate with other entities through a mobile device. To do so, management controller 210 may inject a command (e.g., via the mailbox) during the pre-extensible firmware interface initialization phase 202. The command may be propagated through the phases and cause a driver for local network 106 to be loaded. For example, during driver initiation phase 204, a local wireless connection startup 212 may be performed thereby placing the data processing system in condition to communicate with mobile device 120. Consequently, when the phases reach operation selection phase 208, a new option for proceeding may be available. The new option may include using the connection to mobile device 120 to obtain data from other entities. The data may be used, for example, to complete startups of data processing system. For example, in a scenario in which the startup management entity is implemented as a basic input output system (BIOS), the obtained data may be used to repair, supplement, and/or replace the code and/or configuration settings for the BIOS (which may be corrupted or otherwise be unavailable for other reasons).

The command may also include data usable for verification purposes. For example, the command may include a pattern which may be used to verify the data processing system to the authorization system 110, one-time passwords and/or other data structures usable to verify the authorization system 110 to the data processing system, data usable to establish session keys for secure communications between data processing system 100 and authorization system 110 via mobile device 120, and/or other types of data usable for security, verification, and/or other purposes.

While illustrated in FIG. 2 with a limited number of phases, a startup process may include additional, fewer, and/or different phases without departing from embodiments disclosed herein.

Figure 3:
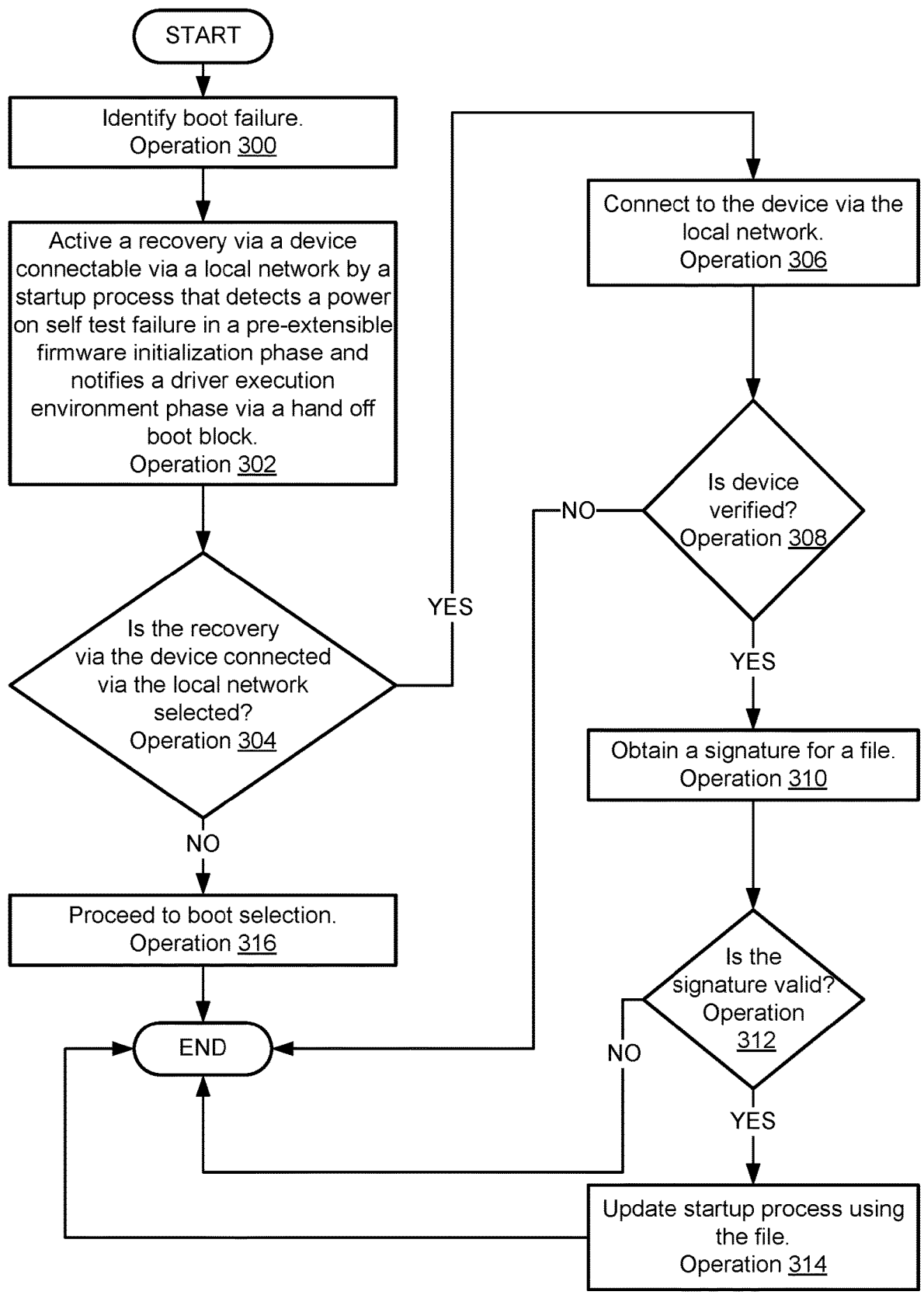
FIG. 3 shows a flow diagram illustrating a method of managing startups of a data processing system in accordance with an embodiment.

As discussed above, the components of FIG. 1 may perform various methods to increase the likelihood of data processing systems being able to enter predetermined manners of operating thereby allowing for computer implemented services to be reliably provided. FIG. 3 illustrate examples of methods that may be performed by the components of FIG. 1. In the diagrams discussed below and shown in these figures, any of the operations may be repeated, performed in different orders, and/or performed in parallel with other operations or performed in a partially overlapping in time manner with other operations.

Turning to FIG. 3A, a flow diagram illustrating a method of managing startups in accordance with an embodiment is shown. The method may be performed, for example, by, entirely or in part, a data processing system and/or management controller of the data processing system, a mobile device, and/or an authorization system.

At operation 300, a boot failure of a data processing system is identified. The boot failure may be identified by monitoring a startup process. The monitoring may indicate that the startup process did not complete and/or that the data processing system does not reach a state, during the startup, in which data from other devices may be obtained to facilitate boot completion.

For example, a management controller hosted by the data processing system may monitor processes performed by a startup management entity of the host data processing system to inventory hardware, load firmware/drivers/configurations, and/or perform other actions as part of the startup of the host data processing system. The management controller may compare these actions to a set of actions that are known to allow the host data process system to complete the boot. If any of these actions are not performed and/or completed, the incomplete/not performed actions may be compared to listing of actions that, if missed, may result in the host data processing system failing to boot (e.g., due to unavailable data) and being unable to resolve its inability to boot (e.g., failure to load certain drivers due to unavailable data that may prevent communication with other devices/systems).

At operation 302, based on the identified boot failure, a recovery via a device connectable (e.g., for data transmission purposes) to the data processing system via a local network is activated. In an embodiment, the recovery is activated, at least in part, by (i) detection of a power on self-test failure in a pre-extensible firmware initiation phase, (ii) notification of subsequent phases (e.g., a driver execution environment phase) of the power on self-test failure, and (iii) initialization of drivers for the local network (e.g., such as bluetooth drivers) such that when a boot selection is made, booting from the mobile device will be available through the local network. The power on self-test failure may be communicated through the phases using a hand off boot block (e.g., a HOB), or another data structure.

The recovery may be activated by (i) sending a command to the startup management entity during a pre-extensible firmware interface initialization phase to load drivers or other entities to support connection to the local network and (ii) a pattern or other data structure usable to verify the data processing system (or hosted management controller) to an authorization system.

The pattern may include any quantity of information and may be encrypted or unencrypted. The pattern and/or encryption method may be known to the authorization system.

In an embodiment, the recovery may be made active by presenting it as an option for continuing a startup. For example, a user of data processing system 100 may be presented with a list of options that includes continuing by connecting to mobile device 120 for data retrieval purposes.

When the startup manager receives the command and/or pattern, the startup manager may load the drivers and operably connect the data processing system to the mobile device.

Figure 4A:
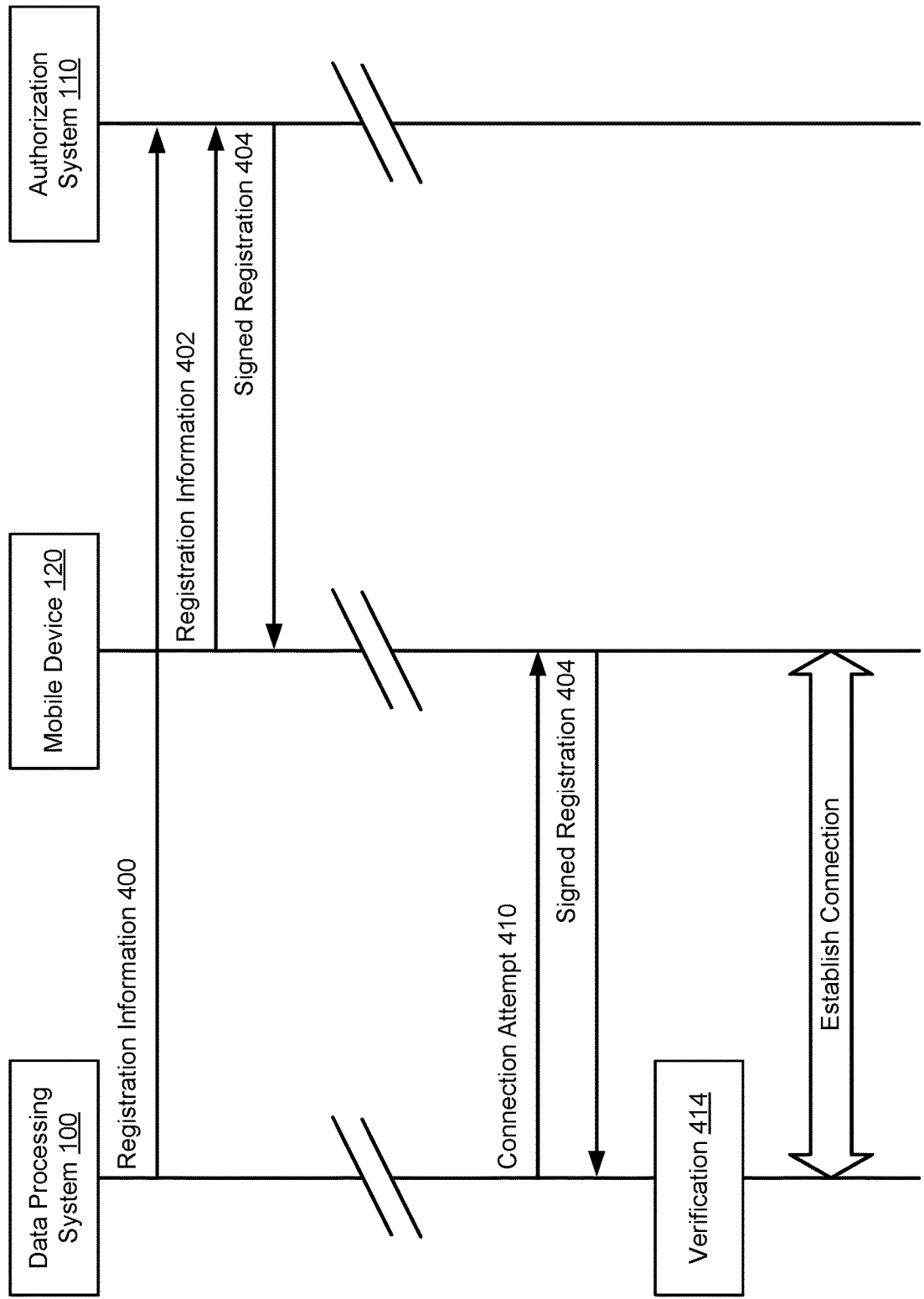
FIG. 4A shows an interaction diagram illustrating verification processes in accordance with an embodiment.

For example, the data elements may include an identity of the application hosted by the mobile device, and identity of the data processing system, and an identifier of the startup management entity. Refer to FIG. 4A for additional details regarding a connection between data processing system 100 and mobile device 120.

At operation 304, it is determined whether the recovery via the device connectable via the local network is selected. The determination may be made based on input from the user obtained via the presented list of options for proceeding during the startup.

If it is determined that the recover via the device connected via the local network is selected, then the method may proceed to operation 306. Otherwise the method may proceed to operation 304 following operation 304.

At operation 316, the data processing system is connected to the device via the local network. In an embodiment, the data processing system is connected by pairing with the device.

As part of the connection process to the device (e.g., mobile device 120), the startup manager may perform a verification for the device. The device may provide a data structure signed by the authorization system. The data structure may include information provided to the authorization system during registration of the data processing system and/or mobile device. The startup management entity may directly or through the management controller, verify that the data structure is signed (e.g., using a public key for authorization system 110), decode the data structure if encoded to obtain one or more data elements, and compare the one or more data elements to corresponding information stored in the data processing system. Refer to FIG. 4A for additional details regarding connecting the data processing system to the device, registration, and/or verification.

At operation 308, a determination is made regarding whether the device is verified. The determination may be made based on the comparison between the data received from the device and data already available to the data processing system. For example, the comparison may be made by (i) verifying a signature of the data, (ii) decoding the data, and/or (iii) performing one or more comparisons between portions of the decoded data and data used as part of registration of the data processing system and/or mobile device with authorization system 110.

If the signature cannot be verified, the data cannot be decoded, or the portions of the decoded to not match the data already available to the data processing system, then it may be determined that the device is not verified.

If the device is verified, then the method may proceed to operation 310 following operation 308. Otherwise the method may end following operation 308.

At operation 310, a signature for a file is obtained. The signature for the file may be obtained by (i) establishing a connection with an authorization system via the device and (ii) receiving the file from the authorization system via the connection. The connection may be secured using a session key. The session key may be obtained using a pre-shared secret known to the data processing system and authorization system.

The file may be any type of file that includes information usable to perform a startup of a data processing system. For example, the file may be a portion of code or configuration for a BIOS of the data processing system.

The signature may be a portion of the obtained file. For example, the authorization system may sign the file. The file may be provided by the authorization system to the data processing system in response to a request from the data processing system sent via the connection.

At operation 312, a determination is made regarding whether the signature is valid. The validity of the signature may be determined using, for example, a public key for the authorization system. The file may be signed by the authorization system using a private key.

If the signature is valid, then the method may proceed to operation 314. Otherwise the method may end following operation 312.

At operation 314, the startup process is updated using the file. The startup process may be updated, for example, by modifying code (e.g., computer code), configuration settings, and/or other information that defines operation of a startup manager of the data processing system.

In an embodiment, the startup process is updated by executing a startup management entity using the file.

The method may end following operation 314.

Returning to operation 304, the method may proceed to operation 316 following operation 304.

At operation 316, the startup may proceed to boot selection. Preceding to boot selection may allow boot operation other than via the local network and device connected to the data processing system via the local network. Proceed to operation 316 may indicate that no errors in the startup process have been detected by the management controller.

The method may end following operation 316.

Following the end of the method shown in FIG. 3, the data processing system may complete a boot. Consequently, the data processing system may enter the predetermined operation state thereby allowing computer implemented services to be provided.

Figure 4B:
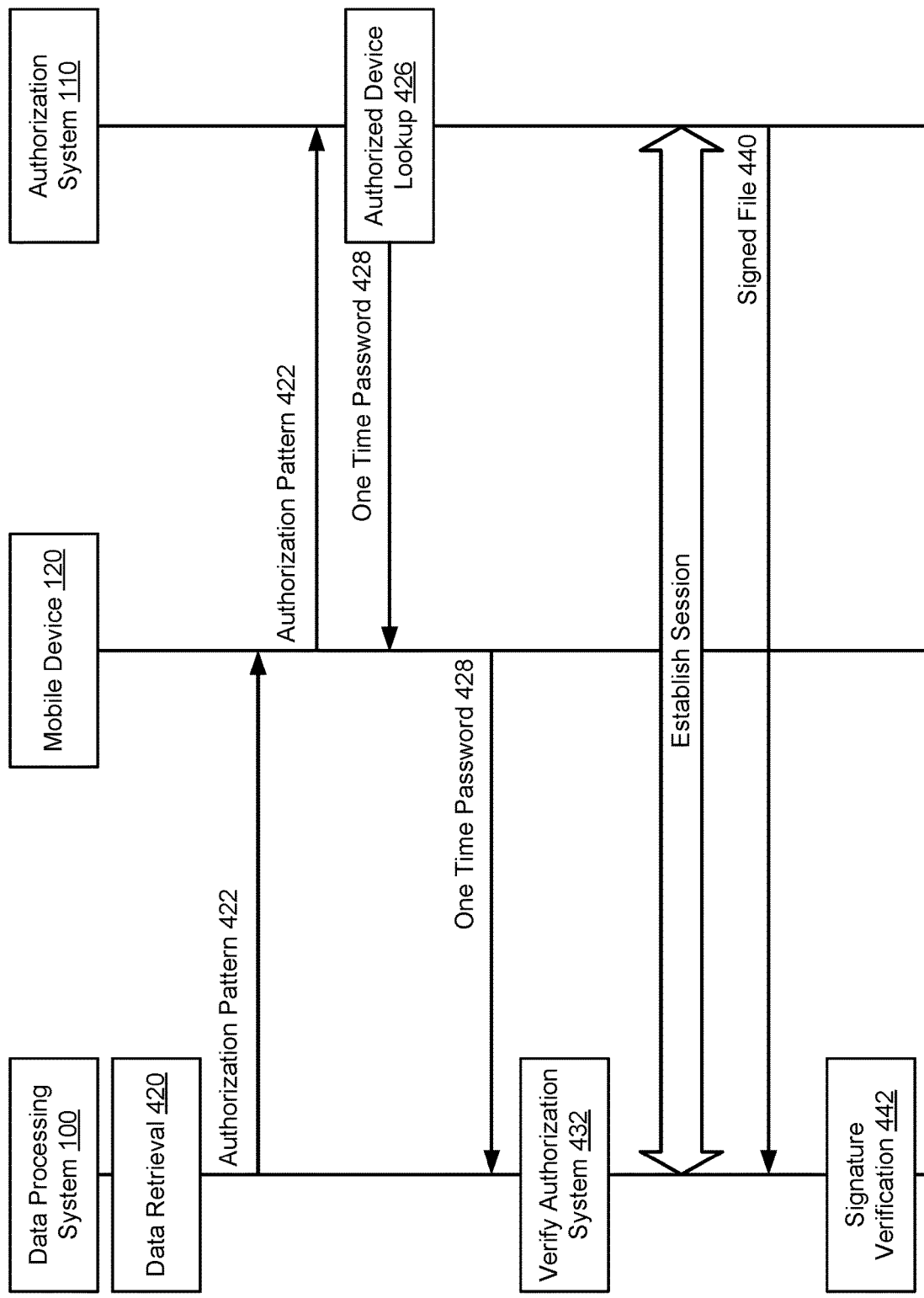
FIG. 4B shows an interaction diagram illustrating continuation of the verification processes in accordance with an embodiment.

As discussed with respect to FIG. 3, various verifications may be performed to address risk inherent in the data processing system connecting to a mobile device. FIGS. 4A-4B illustrate actions that may be performed by components of the system of FIG. 1 to manage connection risk. In these figures, actions performed by various components and interactions between components (e.g., data transmissions) are shown. The actions performed by the respective components are shown with boxes in alignment with the line descending from the box representing the respective components of the system. Interactions between components are illustrated with arrows interconnecting the lines descending from the boxes. Generally, the actions and interactions are ordered as may be performed in a temporal order with earlier actions/interactions being towards the top of the page and later performed actions/interactions being towards the bottom of the page. The actions/interactions may be performed in other orders.

Turning to FIG. 4A, a first interaction diagram in accordance with an embodiment is shown. A seen in the interaction diagram, to facilitate use of mobile device 120 as an intermediary for data processing system 100, both devices may send registration information 400, 402 to authorization system. The registration information may include information regarding the respective devices. For example, registration information 402 may include an identifier of an application hosted by mobile device 120 that may facilitate operation of mobile device 120 as an intermediary, an identifier of data processing system 100, and an identifier of a startup manager such as a BIOS (e.g., off the mobile device and/or data processing system. Registration information 400, 402 may be encoded (e.g., in base 64 or other standard).

In response to registration information 400, 402, authorization system 110 may associate (i) patterns or other identifiers that data processing system 100 may provide with both (ii) mobile device 120 and (iii) a method for communicating with mobile device 120 (e.g., an email address, a phone number for text messaging, etc.). Authorization system 110 may, after completing the registration, sign registration information 402 and provide the signed registration 404 to mobile device 120. Similar information may be provided to data processing system 100 (and/or the hosted management controller).

At this point, data processing system 100 may have access to all of the information that it needs to (i) verify mobile device 120, (ii) verify authorization system 110, and (iii) verify files.

At some point in the future, data processing system 100 may fail to perform a startup resulting in the method illustrated in FIG. 3 being performed. As part of that method (e.g., operation 306), data processing system 100 may perform a connection attempt 410 with mobile device 120 to communicate via local network 106. When the initial connection is made, data processing system 100 may not be certain that the connected device is mobile device 120. To establish its identity to data processing system, mobile device 120 may provide signed registration 404.

Data processing system 100 may, using a public key, perform a verification to determine that the registration is signed by authorization system 110, and verify the identity of mobile device 120 based on the content of signed registration 404. If any of these identities cannot be verified, then data processing system 100 may treat mobile device 120 as not being verified (e.g., may terminate the connection). In contrast, if these identifies are verified, then data processing system 100 may establish a connection to mobile device 120, as seen in FIG. 4A with the oversized line terminating in arrows between data processing system 100 and mobile device 120.

Turning to FIG. 4B, a second interaction diagram (e.g., a continuation of the first in FIG. 4A) in accordance with an embodiment is shown. Once data processing system 100 is connected to mobile device 120 via the local network, data processing system 100 may initiate a data retrieval 420 for data from authorization system 110. To do so, data processing system 100 may send an authorization pattern 422 to mobile device 120. Mobile device 120 may relay the authorization pattern 424 to authorization system 110. Authorization system 110 may perform an authorize device lookup 426 (e.g., based on the registrations discussed with respect to FIG. 4A) using the authorization pattern to identify contact information. The contact information may be an email address, phone number, or other identifier usable to send data to mobile device 120.

Using the contact information, a one-time password 428 may be sent to mobile device 120. Mobile device 120 may forward the one-time password 428 to data processing system 100. Data processing system 100 may use the one-time password 428 to verify authorization system 432. For example, the management controller of data processing system 100 may be programmed with the one-time password (or information usable to obtain) at a factory setting, similar to the authorization pattern (or information usable to obtain). In this manner, both the data processing system 100 and authorization system may verify themselves to the other (e.g., by inclusion of shared secrets and/or information derived from shared secrets).

At this point, all of the components of the system may be verified.

To obtain data from authorization system 110, data processing system 100 may establish a session with authorization system 110. The session may be established with a session key that allows these devices to communicate with one another using encrypted communications.

Once the session is established, authorization system 110 may send a signed file 440 to data processing system 100. Signed file 440 may include data usable for data processing system 100 to complete a startup (e.g., such as a BIOS image, configuration settings, etc.).

Once the signed file 440 is received by data processing system 100, the signed file may be subjected to signature verification 442. For example, a public key may be used to verify that the file is from authorization system 110 (e.g., signed using a private key).

If the file is verified, then it may be used by data processing system 100 to complete its startup. Otherwise the file may be discarded or otherwise treated as being unverified.

Thus, as shown in FIGS. 4A-4B, the process utilized by a data processing system for obtaining information usable to complete a startup may verify the entities of (and/or files sent by) a distributed system for security purposes.

In addition to the above noted features, embodiments disclosed herein may be broadly applicable to a wide range of different scenarios.

For example, consider a scenario where a service operating system usable to repair a startup manager of a data processing system becomes corrupt, or files on which the service operating system relies become corrupted (or otherwise inaccessible). To complete startups in such scenarios, data stored in a mobile device may be used to supplement local data so that the boot may be completed.

Figure 5:
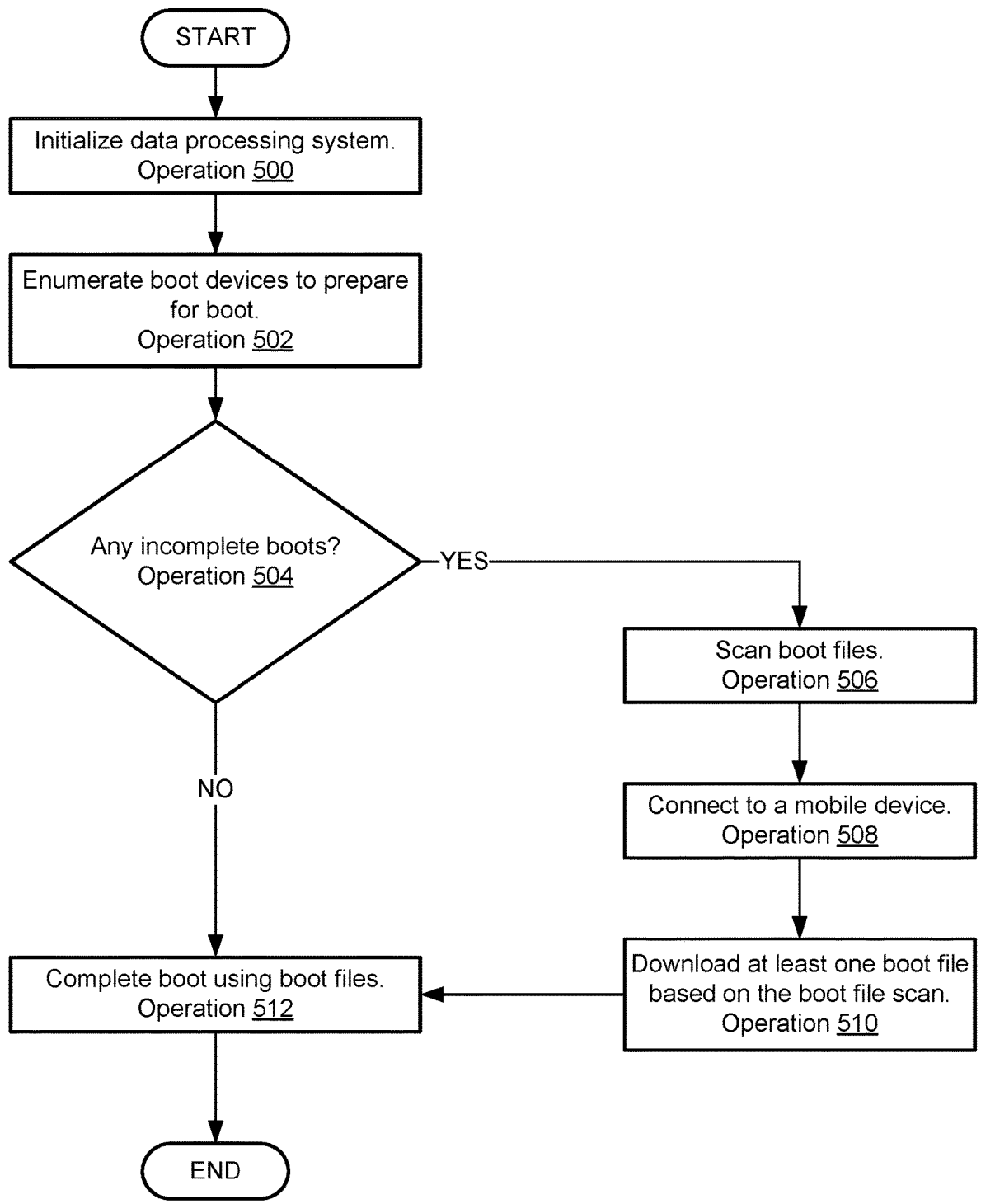
FIG. 5 shows a flow diagram illustrating a method of booting to a rescue operating system in accordance with an embodiment.

Turning to FIG. 5, a flow chart illustrating a method of completing a boot in accordance with an embodiment is shown.

At operation 500, a data processing system is initialized. For example, the startup manager may begin and start performing phases of a startup.

At operation 502, boot devices for the data processing system are enumerated to prepare for a boot (e.g., to a management entity).

At operation 504, a determination is made regarding any incomplete boots have been attempted. The determination may be made by a management processor monitoring the boot process performed by the startup manager.

If an incomplete boot has been performed, the method may proceed to operation 506. Otherwise, the method may proceed to operation 512.

At operation 506, the boot files are scanned. The boot files may be scanned, for example, based on the enumerated boot devices. Because an incomplete boot has been performed, the boot files may be partially damaged, corrupted, or for other reasons are unable to be used to complete a boot. For example, a recovery image/service operating system may have been corrupted.

At operation 508, the data processing system connected to a mobile device, as described with respect to FIGS. 1-4B.

At operation 510, at least one boot file is downloaded based on the boot file scan. The boot file may include, for example, a copy of the recovery image/service operating system. The at least one boot file may be downloaded from an authorization manager using a verification process as described with respect to FIGS. 1-4B.

At operation 512, a boot is completed using the boot files. If a boot file is obtained in operation 510, the downloaded boot file may be used to complete the boot. Completing the boot may handoff operation of the data processing system to the service operating system, which may facilitate further repair/recovery of the data processing system.

The method may end following operation 512.

Prior to operation 504, one or more boot failures may need to be detected so that the determination of operation 504 may be performed.

Figure 6:
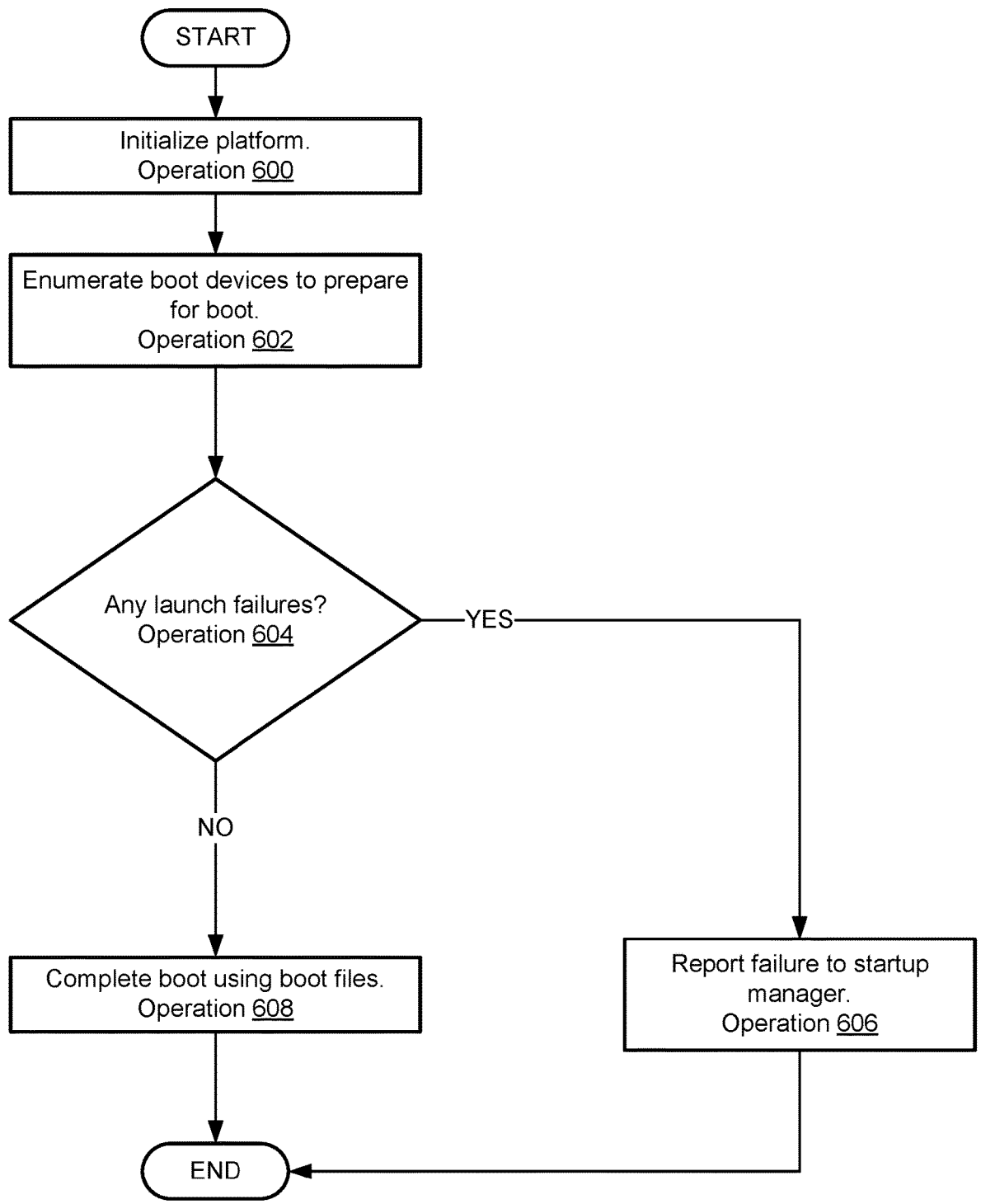
FIG. 6 shows a flow diagram illustrating a method of detecting a boot failure in accordance with an embodiment.

Turning to FIG. 6, a flow chart illustrating a method of identifying an incomplete boot in accordance with an embodiment is shown.

At operation 600, a data processing system is initialized. For example, the startup manager may begin and start performing phases of a startup.

At operation 602, boot devices for the data processing system are enumerated to prepare for a boot (e.g., to a management entity).

At operation 604, a determination is made regarding wherein any launch failures have occurred. The determination may be made by a management processor monitoring the boot process performed by the startup manager.

If a launch failure has occurred, the method may proceed to operation 606. Otherwise the method may proceed to operation 608.

At operation 606, the launch failure is reported to a startup manager. The launch failure may be reported via a mailbox communication.

Returning to operation 604, the method may proceed to operation 608 following operation 604 when no launch failures have occurred.

At operation 608, a boot of the data processing system is completed.

The method may end following operation 608.

Using the method illustrated in FIG. 606, a management controller may both observe and document boot failures for startup managers. The startup managers may otherwise be unaware of the launch failures. The communicated launch failures may be used, for example, as a basis for the determination made in operation 504.

Any of the components illustrated in FIGS. 1-5 may be implemented with one or more computing devices. Turning to FIG. 7, a block diagram illustrating an example of a computing device in accordance with an embodiment is shown. For example, system 700 may represent any of the data processing systems and/or computing devices described above performing any of the processes or methods described above. System 700 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 700 is intended to show a high level view of many components of the computer system. However, it is to be understood that additional components may be present in certain implementations and furthermore, different arrangement of the components shown may occur in other implementations. System 700 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 700 includes processor 701, memory 703, and devices 705-708 via a bus or an interconnect 710. Processor 701 may represent a single processor or multiple processors with a single processor core or multiple processor cores included therein. Processor 701 may represent one or more general-purpose processors such as a microprocessor, a central processing unit (CPU), or the like. More particularly, processor 701 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 701 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 701, which may be a low power multi-core processor socket such as an ultra-low voltage processor, may act as a main processing unit and central hub for communication with the various components of the system. Such processor can be implemented as a system on chip (SoC). Processor 701 is configured to execute instructions for performing the operations discussed herein. System 700 may further include a graphics interface that communicates with optional graphics subsystem 704, which may include a display controller, a graphics processor, and/or a display device.

Processor 701 may communicate with memory 703, which in one embodiment can be implemented via multiple memory devices to provide for a given amount of system memory. Memory 703 may include one or more volatile storage (or memory) devices such as random access memory (RAM), dynamic RAM (DRAM), synchronous DRAM (SDRAM), static RAM (SRAM), or other types of storage devices. Memory 703 may store information including sequences of instructions that are executed by processor 701, or any other device. For example, executable code and/or data of a variety of operating systems, device drivers, firmware (e.g., input output basic system or BIOS), and/or applications can be loaded in memory 703 and executed by processor 701. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 700 may further include IO devices such as devices (e.g., 705, 706, 707, 708) including network interface device(s) 705, optional input device(s) 706, and other optional IO device(s) 707. Network interface device(s) 705 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 706 may include a mouse, a touch pad, a touch sensitive screen (which may be integrated with a display device of optional graphics subsystem 704), a pointer device such as a stylus, and/or a keyboard (e.g., physical keyboard or a virtual keyboard displayed as part of a touch sensitive screen). For example, input device(s) 706 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 707 may include an audio device. An audio device may include a speaker and/or a microphone to facilitate voice-enabled functions, such as voice recognition, voice replication, digital recording, and/or telephony functions. Other IO devices 707 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 707 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 710 via a sensor hub (not shown), while other devices such as a keyboard or thermal sensor may be controlled by an embedded controller (not shown), dependent upon the specific configuration or design of system 700.

To provide for persistent storage of information such as data, applications, one or more operating systems and so forth, a mass storage (not shown) may also couple to processor 701. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 701, e.g., via a serial peripheral interface (SPI). This flash device may provide for non-volatile storage of system software, including a basic input/output software (BIOS) as well as other firmware of the system.

Storage device 708 may include computer-readable storage medium 709 (also known as a machine-readable storage medium or a computer-readable medium) on which is stored one or more sets of instructions or software (e.g., processing module, unit, and/or processing module/unit/logic 728) embodying any one or more of the methodologies or functions described herein. Processing module/unit/logic 728 may represent any of the components described above. Processing module/unit/logic 728 may also reside, completely or at least partially, within memory 703 and/or within processor 701 during execution thereof by system 700, memory 703 and processor 701 also constituting machine-accessible storage media. Processing module/unit/logic 728 may further be transmitted or received over a network via network interface device(s) 705.

Computer-readable storage medium 709 may also be used to store some software functionalities described above persistently. While computer-readable storage medium 709 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 728, components and other features described herein can be implemented as discrete hardware components or integrated in the functionality of hardware components such as ASICS, FPGAs, DSPs or similar devices. In addition, processing module/unit/logic 728 can be implemented as firmware or functional circuitry within hardware devices. Further, processing module/unit/logic 728 can be implemented in any combination hardware devices and software components.

Note that while system 700 is illustrated with various components, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer-implemented method for managing operation of a data processing system, the method comprising:
   detecting a boot failure of the data processing system;
   in response to the boot failure and as part of a startup of the data processing system:
      activating a recovery for the data processing system using a device connectable via a local wireless network, the device being operably connected to an authorization system;
      connecting to the device via the local wireless network for the recovery;
      making a first determination that the device is verified;
      based on the first determination:
         establishing a connection to the authorization system via the device;
         obtaining a signed file from the authorization system;
         making a second determination that a signature of the signed file is verified; and
         updating the startup of the data processing system using the file based on the second determination.

2. The computer-implemented method of claim 1, wherein the connection to the authorization system is secured using a pre-shared key.

3. The computer-implemented method of claim 2, wherein the first determination is made by providing an authorization pattern to the device, the authorization pattern being known to a management controller of the data processing system and the authorization system but not the device.

4. The computer-implemented method of claim 3, wherein the first determination is further made by receiving a one-time password from the device, the one-time password being generated by the authorization system and verifiable by the management controller using a public key for the authorization system.

5. The computer-implemented method of claim 4, further comprising:
   registering, with the authorization system, the device, the device registration associating the authorization pattern with contact information for the device, the contact information indicating a different communication path for communicating with the device than a communication path through which the authorization pattern is provided to the authorization system.

6. The computer-implemented method of claim 5, wherein the first determination is further made by receiving a signed blob, the signed blob being signed by the authorization system and comprising an identifier for the device, an identifier for the data processing system, and an identifier of a startup management entity hosted by the data processing system.

7. The computer-implemented method of claim 6, wherein the first determination is further made by verifying the signed blob against data stored in the management controller and known to the authorization system.

8. A non-transitory machine-readable medium having instructions stored therein, which when executed by a processor, cause a data processing system to perform operations, the operations comprising:
  detecting a boot failure of the data processing system;
  in response to the boot failure and as part of a startup of the data processing system:
    activating a recovery for the data processing system using a device connectable via a local wireless network, the device being operably connected to an authorization system;
    connecting to the device via the local wireless network for the recovery;
    making a first determination that the device is verified;
    based on the first determination:
      establishing a connection to the authorization system via the device;
      obtaining a signed file from the authorization system;
      making a second determination that a signature of the signed file is verified; and
      updating the startup of the data processing system using the file based on the second determination.

9. The non-transitory machine-readable medium of claim 8, wherein the connection to the authorization system is secured using a pre-shared key.

10. The non-transitory machine-readable medium of claim 9, wherein the first determination is made by providing an authorization pattern to the device, the authorization pattern being known to a management controller of the data processing system and the authorization system but not the device.

11. The non-transitory machine-readable medium of claim 10, wherein the first determination is further made by receiving a one-time password from the device, the one-time password being generated by the authorization system and verifiable by the management controller using a public key for the authorization system.

12. The non-transitory machine-readable medium of claim 11, wherein the operation further comprise:
  registering, with the authorization system, the device, the device registration associating the authorization pattern with contact information for the device, the contact information indicating a different communication path for communicating with the device than a communication path through which the authorization pattern is provided to the authorization system.

13. The non-transitory machine-readable medium of claim 12, wherein the first determination is further made by receiving a signed blob, the signed blob being signed by the authorization system and comprising an identifier for the device, an identifier for the data processing system, and an identifier of a startup management entity hosted by the data processing system.

14. The non-transitory machine-readable medium of claim 13, wherein the first determination is further made by verifying the signed blob against data stored in the management controller and known to the authorization system.

15. A data processing system, comprising:
  a hardware processor adapted to execute a startup management entity configured to perform a boot of the data processing system; and
  a management controller configured to:
    detect a boot failure of the data processing system;
    in response to the boot failure and as part of a startup of the data processing system:
      activate a recovery for the data processing system using a device via a local wireless network, the device being operably connected to an authorization system;
      connect to the device via the local wireless network for the recovery;
      make a first determination that the device is verified;
      based on the first determination:
        establish a connection to the authorization system via the device;
        obtain a signed file from the authorization system;
        make a second determination that a signature of the signed file is verified; and
        update the startup management entity of the data processing system using the file based on the second determination.

16. The data processing system of claim 15, wherein the connection to the authorization system is secured using a pre-shared key.

17. The data processing system of claim 16, wherein the first determination is made by providing an authorization pattern to the device, the authorization pattern being known to a management controller of the data processing system and the authorization system but not the device.

18. The data processing system of claim 17, wherein the first determination is further made by receiving a one-time password from the device, the one-time password being generated by the authorization system and verifiable by the management controller using a public key for the authorization system.

19. The data processing system of claim 18, wherein the management controller is further configured to:
  register, with the authorization system, the device, the device registration associating the authorization pattern with contact information for the device, the contact information indicating a different communication path for communicating with the device than a communication path through which the authorization pattern is provided to the authorization system.

20. The data processing system of claim 19, wherein the first determination is further made by receiving a signed blob, the signed blob being signed by the authorization system and comprising an identifier for the device, an identifier for the data processing system, and an identifier of a startup management entity hosted by the data processing system.

* * * * *